W. H. BARNES.
RAILWAY TICKET RECEIPT.
APPLICATION FILED JUNE 8, 1909.

952,780.

Patented Mar. 22, 1910.

Fig. 1.

IDENTIFICATION
Received
252,765                7
RECEIPT
Delivered              6
252,765
DEPOSIT HERE
Seat
Upper
Car No.    Lower
Line       Room
252,765
Number of Passengers
Destination    4    3

ITEMS

Fig. 2.

Witnesses:

Inventor:
William H. Barnes

UNITED STATES PATENT OFFICE.

WILLIAM H. BARNES, OF CHICAGO, ILLINOIS.

RAILWAY-TICKET RECEIPT.

952,780.  Specification of Letters Patent.  Patented Mar. 22, 1910.

Application filed June 8, 1909. Serial No. 500,829.

*To all whom it may concern:*

Be it known that I, WILLIAM H. BARNES, a citizen of the United States, residing at Chicago, in the county of Cook and State of Illinois, have invented certain new and useful Improvements in Railway-Ticket Receipts, of which the following is a specification.

This invention relates to an improved construction in railway ticket receipts and has for its essential object to make the same either in the form of a receptacle or coupon check, the said coupon check serving not only to identify the ticket, but also acting as a receipt therefor, thus safe-guarding passengers traveling in Pullman cars, whose destination is either beyond that of the car or who transfer from the car at some junction point for a destination other than that in which the train is going.

The invention consists in the features of construction and combination of parts hereinafter described and claimed.

In the drawings, Figure 1 is a front elevation of this improved device in the form of a ticket envelop with identification and receipt coupons or checks attached thereto; and Fig. 2, a side sectional elevation thereof.

As shown in Fig. 1, this improved railway ticket receipt comprises a rectangular paper envelop body 3, having printed upon its front side or face 4, the necessary data or memoranda to enable the car conductor when taking up a passenger's ticket to indicate thereon the particular car seat, upper or lower berth, drawing room, number of passengers, destination, etc., the lower portion thereof being provided, as indicated, with suitably spaced lines for the insertion of additional facts or items. The back side or wall 5 of this ticket envelop is somewhat longer than its front wall 4 and has several detachable checks or coupons 6 and 7, having suitable printed matter thereon.

The check or coupon 7 serves to identify the holder of the ticket and has printed thereon the same number or other identification mark as is printed on the check or coupon 6 and body 3 of the ticket envelop.

Heretofore it has been the customary practice to take up the passenger's ticket, the conductor depositing the same within an envelop and usually giving the passenger a receipt therefor, the receipt in no wise showing the destination or other important facts, so that if the conductor by mistake handed a wrong ticket or receipt to the passenger, it remained a matter of dispute and argument as to what the facts were. This improved ticket receipt eliminates such confusion and trouble, since when the ticket is taken up and deposited in the envelop, the identification check or coupon and receipt check or coupon may both be given to the passenger. The identification coupon serves to identify the ticket held by the conductor and the receipt coupon is surrendered by the passenger to the conductor upon the delivery of the railway ticket to him, the receipt check or coupon being usually deposited by the conductor in the envelop or receptacle.

The provision of separate, detachable checks or coupons enables an accurate audit of all ticket holders upon the train to be readily made by both the Pullman and train conductor, and the receipt check or coupon insures the passenger against mistake or error, so that he will not be unduly inconvenienced in transferring from one train to another. The ticket envelop or receptacle has suitable data or memoranda printed upon its face so as to enable the conductor to tell at a glance the exact location, place, and destination of the passenger.

I claim:

A railway ticket receipt in the form of an envelop having suitable identifying data printed thereon, the envelop having two detachable coupons, both of which may be given to the passenger at the time his ticket is surrendered, one of the coupons being permanently retained by the passenger for identifying purposes, and the other coupon being surrendered to the conductor upon the delivery of the ticket to the passenger, serving as a receipt therefor, the identification and receipt coupons and ticket envelop being similarly marked or numbered for protecting the passenger in case the ticket has not been returned, and the coupon calling therefor has been surrendered to the conductor, substantially as described.

WILLIAM H. BARNES.

Witnesses:
 WALKER BANNING,
 PIERSON W. BANNING.